United States Patent [19]
Rudolph

[11] 3,978,878
[45] Sept. 7, 1976

[54] RESILIENT SUPPLY AND EXHAUST VALVE

[76] Inventor: Hans Rudolph, 7200 Wyandotte, Kansas City, Mo. 64114

[22] Filed: Sept. 18, 1975

[21] Appl. No.: 614,592

[52] U.S. Cl. .............................. 137/102; 137/512.2; 251/61.1
[51] Int. Cl.² ...................... G05D 7/00; F16K 15/14
[58] Field of Search ............ 137/102, 512.15, 512.4, 137/512.2; 251/61.1

[56] References Cited
UNITED STATES PATENTS

| | | | |
|---|---|---|---|
| 2,646,063 | 7/1953 | Hayes | 137/512.4 X |
| 2,966,917 | 1/1961 | Bloom | 137/102 X |
| 3,435,839 | 4/1969 | Elder | 137/512.2 X |
| 3,739,801 | 6/1973 | Rudolph | 137/102 |
| 3,861,642 | 1/1975 | Maddocks | 251/61.1 |

FOREIGN PATENTS OR APPLICATIONS

| | | | |
|---|---|---|---|
| 1,397,739 | 6/1975 | United Kingdom | 137/535 |

*Primary Examiner*—William R. Cline
*Attorney, Agent, or Firm*—Fishburn, Gold & Litman

[57] ABSTRACT

A valve device includes a body member and valve members and is adapted for use in breathing apparatus, such as respirating apparatus, wherein sensitivity of operation enables a valve element to open and close effectively in response to relatively light fluid pressure. The valve device includes a tubular valve mounting member positioned in a valve chamber formed within the valve body and having first and second flanges of an elongated tubular extensible member seated on respective opposite ends thereof and positioned in sealing engagement with the body member. The extensible member has an end wall engageable with a valve seat formed by a tubular annular portion extending inwardly into the valve chamber from the body member and having an outlet opening therethrough and the end wall of the extensible member has ports therein for flow of fluid into and through the outlet opening when a valve element on the end wall of the extensible member is moved to an open position in response to fluid pressure in the extensible member. The end flange adjacent the end wall of the extensible member has a plurality of ports therein for flow into the valve chamber from the outlet opening and outwardly through an exhaust fitting when the valve element is seated on the end wall of the extensible member.

11 Claims, 5 Drawing Figures

RESILIENT SUPPLY AND EXHAUST VALVE

The present invention relates to valve devices and more particularly to a valve device adapted for use in breathing apparatus wherein sensitivity of operation enables the valve to open and close effectively in response to relatively light fluid pressure.

The present invention is an improvement of the valve structure disclosed in U.S. Pat. No. 3,739,801 issued June 19, 1973 and provides a structure of reduced cost, and a superior support and guide structure for the movable valve parts.

The principal objects of the present invention are: to provide an improved valve device which is capable of quickly assuming full flow position under relatively light pressure and closing substantially instantaneously as flow ceases; to provide such an improved valve device having a resilient extensible member with flexible end flanges at each of opposite ends thereof retained in sealing engagement with a body member and having an end wall movable between outlet flow and exhaust flow permitting positions; to provide such a valve device including a valve mounting member with end flanges of the extensible member seated thereon for support of an end wall of the extensible member during movement thereof in response to fluid pressure; to provide such a valve device with a resilient extensible member and a valve element carried on an end wall thereof that move in response to differential fluid pressure for directing fluid flow; to provide such a valve device wherein the valve element on the end wall opens in response to inlet flow of fluid and closes in response to reverse flow of fluid with the reverse flow being directed out of the valve device through an exhaust passage and the valve is supported and guided in its movement by a flange member having a rim and a plurality of circumferentially spaced flexible bars or fingers; to provide such a valve device wherein said flange and fingers thereof are the only support and guide for the valve member end; to provide such a valve device having a minimum of moving parts and wherein the moving parts are resilient members to thereby provide long life and substantially eleminate wear on other elements of the valve structure; and to provide such a valve device wherein the components thereof are easily and accurately assembled which has great dependability of performance, is of simple and durable construction, is economical to manufacture, is positive in operation, and is particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the valve device.

Figure 1:
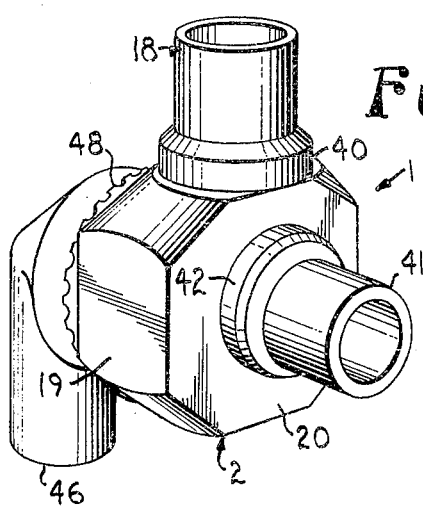
FIG. 1 is a perspective view of a valve device embodying features of the present invention.
Figure 2:
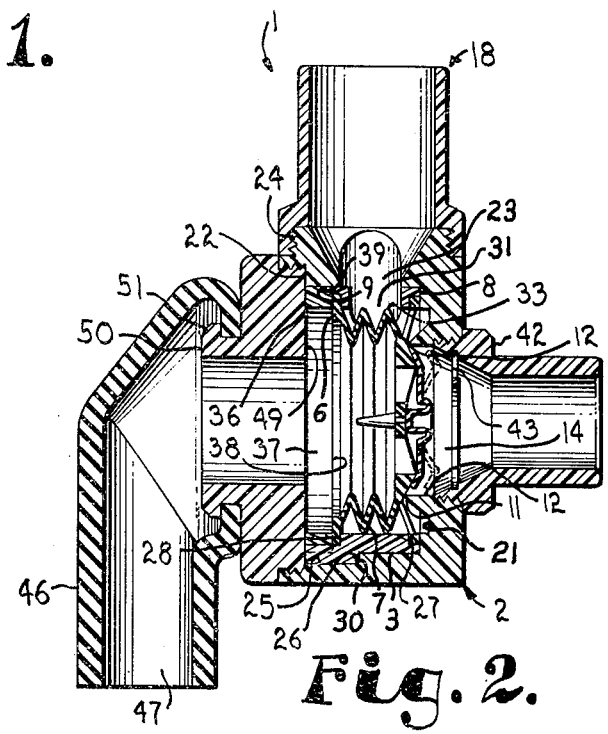
FIG. 2 is a longitudinal sectional view through the valve device and showing flexible elements thereof positioned for flow through an outlet opening.
Figure 4:
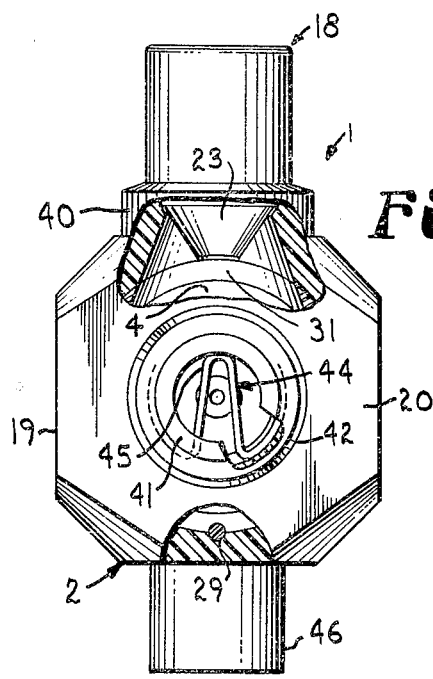
FIG. 4 is an end elevational view of the valve device and showing an outlet fitting thereon and with portions broken away to better illustrate the components thereof.
Figure 3:
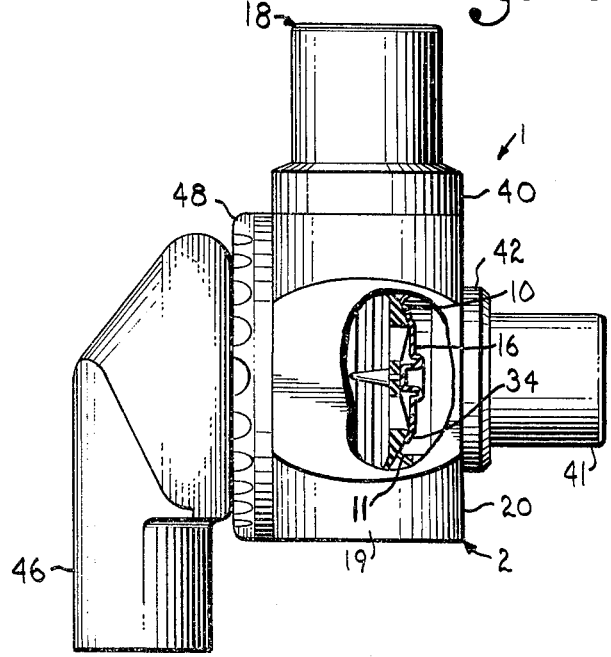
FIG. 3 is a side elevational view of the valve device with portions broken away to better illustrate the component parts thereof and showing the flexible elements positioned for fluid flow outwardly through an exhaust passage.
Figure 5:
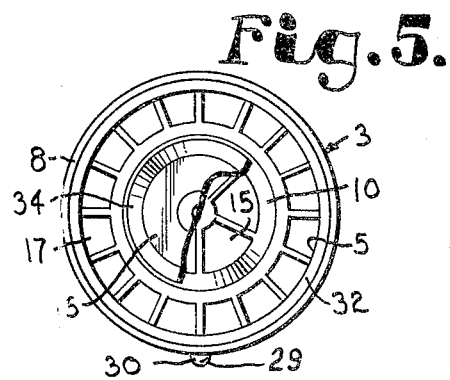
FIG. 5 is an end elevational view of a mounting member and an end flange of an extensible member with portions of a valve element mounted thereon broken away to illustrate ports in an end wall of the extensible member.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring more in detail to the drawings:

In the disclosed embodiment of the present invention, the reference numeral 1 generally designates a valve device adapted for use in breathing apparatus, such as respiration apparatus. The valve device 1 includes a body member 2 and valve members wherein sensitivity of operation enables a valve element to open and close effectively in response to relatively light fluid pressure.

The valve body 2 has a valve chamber 4 therein and a valve seat surrounding an outlet opening for flow of fluid therethrough. An elongated tubular member is positioned in the valve chamber 4 and has one end thereof in sealing engagement with the valve body 2 and in spaced relation with the valve seat. The tubular member has an end wall at the other end thereof which is positioned in facing relation with and shaped to engage the valve seat to close the outlet opening. The end wall of the tubular member has ports therein spaced inwardly of the valve seat. The tubular member has a valve element on the end wall thereof and movable to an open position in response to fluid pressure in the tubular member.

The tubular member has means extending therefrom and adjacent the end wall thereof and having a peripheral portion mounted on the body member 2 for supporting the end wall of the tubular member and permitting movement thereof toward and away from the valve seat for seating and unseating of the end wall of the tubular member. The means for supporting the end wall of the tubular member is adapted to permit flow of fluid into the valve chamber from the outlet opening.

The illustrated valve device 1 includes a tubular valve mounting member 3 positioned in a valve chamber 4 formed within the body member 2 and having first and second end flanges 5 and 6 of an elongated tubular extensible member 7 seated on opposite ends 8 and 9 respectively of the mounting member 3 and positioned in sealing engagement with the body member 2. The extensible member 7 has an end wall 10 engageable with a valve seat 11 formed by a tubular annular portion 12 extending inwardly into the valve chamber 4 from the body member 2 and having an outlet opening 14 therethrough. The end wall 10 of the extensible member 7 has ports 15 therein for flow of fluid into and through the outlet opening 14 where a valve element 16 on the end wall 10 is moved to an open position in response to fluid pressure in the extensible member 7. One end of the flanges, for example the end flange 5 adjacent the end wall 10 of the extensible member 7, has a plurality of ports 17 therein for flow into the valve chamber 4 from the outlet opening 14 and outwardly through an exhaust fitting 18 when the valve element 16 is seated on the end wall 10 of the extensible member 7 in response to inwardly directed flow through the outlet opening 14.

The illustrated valve body member 2 has a side wall 19 and an end wall 20 defining the valve chamber 4 therein. An outlet opening 14 is positioned in the end wall 20 and defined by the annular portion 12 extending into the valve chamber 4 from the end wall 20 and terminating at the valve seat 11. An interior surface of the end wall 20 has surfaces defining a recess 21 therein and surrounding the annular portion 12. The end wall 20 is adapted to receive thereon an outlet fitting, as later described.

The side wall 19 of the body member 2 has an end surface 22 spaced from the end wall 20 and defining an outwardly facing shoulder. The side wall 19 has an exhaust opening 23 therein. An annular or tubular portion 24 extends from the side wall 19 and surrounds the exhaust opening 23. The tubular portion or projection 24 has an exterior surface thereof threaded to receive the exhaust fitting 18 thereon, as later described.

The side wall 19 has surfaces defining a groove or guideway 25 in an interior surface thereof. The groove 25 has an end surface 26 positioned intermediate the end surface 22 of the side wall 19 and an interior surface of the end wall 20. The end of the side wall 19 is adapted to receive an inlet fitting thereon adjacent the end surface 22, as later described.

The mounting member 3 is illustrated as a tubular member mounted in the body member 2 and having a fluid passage therethrough. The opposite ends 8 and 9 of the mounting member 3 each have counter bores defining respective recesses therein and outwardly facing shoulders 27 and 28 respectively. The mounting member 3 has a rib 29 extending from an exterior surface thereof and adapted to be received in the groove 25 in the interior surface of the side wall 19 of the body member 2. The rib 29 has one end 30 thereof engageable with the end surface 26 of the groove 25 when the one end 8 of the mounting member 3 engages the interior surface of the end wall 20 of the body member 2. The other end of the rib 29 is spaced from the other end 9 of the mounting member 3, for a purpose later described.

The mounting member 3 has an exhaust opening 31 extending through a wall thereof and alignable with the exhaust opening 23 in the side wall 19 of the body member 2 when the rib 29 is received within the groove 25 and the one end 8 is in engagement with the interior surface of the end wall 20 of the body member 2.

The mounting member 3 is illustrated as a separate component for ease of assembly, however, the mounting member 3 may be integral with the side wall 19 of the body member 2 with the side wall 19 having surfaces defining a recess adjacent the end wall 20 corresponding to the recess defined by the counter bore at the first end 8 of the mounting member 3 and with the side wall 19 having counter bores defining first and second outwardly facing shoulders adjacent and inwardly of the end surface 22 thereof.

The extensible member 7 is an elongated tubular member positioned within the mounting member 3 and with the first end flange 5 seated on the outwardly facing shoulder 27 at the one end 8 thereof. The second flange 6 is seated on the outwardly facing shoulder 28 at the other end 9 of the mounting member 3. The first end flange 5 of the extensible member 7 has a rim portion thereof with one surface coplanar with the one end 8 of the mounting member 3 and in engagement with the interior surface of the end wall 20 of the body member 2. The first end flange 5 extends outwardly from and is substantially coplanar with the end wall 10 of the extensible member 7 and has the ports 17 therein circumferentially spaced for flow of fluid from the outlet opening 14 into the valve chamber 4 and outwardly through the exhaust openings 31 and 23 and through the exhaust fitting 18. In the illustrated embodiment, the first end flange 5 is defined by a plurality of circumferentially spaced support members extending from the end wall 10 and connected to a rim portion at the periphery thereof.

The end wall 10 of the extensible member 7 is shaped to engage the valve seat 11 to close the outlet opening 14. The ports 15 in the end wall 10 are spaced inwardly of the valve seat 11. The end wall 10 is a flexible planar member having the ports 15 therein circumferentially spaced with the valve element 16 mounted on the center of the end wall 10.

The first end flange 5 is substantially coplanar with the end wall 10 and has a thickened peripheral rim 32 with one face thereof substantially coplanar with the one end 8 of the valve mounting member 3 and each in engagement with the interior surface of the end wall 20 of the body member 2 whereby each of the support members of the first end flange 5 is spaced from the interior surface of the end wall 20 of the body member 2 and the ports 17 in the first end flange 5 are in facing relation with the surfaces defining the recess 21 in the end wall 20 of the body member 2.

The extensible member 7 has a plurality of accordian folds 33 intermediate the first and second end flanges 5 and 6 to permit longitudinal movement of the end wall 10 thereof toward and away from the valve seat 11. The valve element 16 is spaced inwardly from the valve seat 11 and is a flexible member mounted on the center of the end wall 10 of the extensible member 7. The valve element 16 has a portion thereof seating on the end wall 10 of the extensible member 7 and positioned around the ports 15 therein to close same. The valve element 16 and the end wall 10 of the extensible member 7 are adapted to flex in response to fluid pressure in the extensible member 7 to open the ports 15 for flow therethrough.

The valve element 16 has a peripheral edge portion 34 thickened to form a skirt having a rim extending into sealing engagement with the end wall 10 of the extensible member 7 and positioned outwardly of the ports 15 therethrough. The center of the disk or valve element 16 is spaced from the end wall 10 of the extensible member 7 and the peripheral edge portion 34 of the valve element 16 is inclined toward the end wall 10.

The ports 15 are spaced inwardly from the valve seat 11 at the free end of the annular portion 12 a sufficient distance such that the rim of the skirt or thickened peripheral edge portion 34 will be within the annular portion 12 and have clearance to flex to lift the skirt away from the end wall 10 for opening the ports 15 in response to pressure against the valve element 16 and beneath the skirt or peripheral edge portion 34 for flow of fluid into the outlet opening 14.

Suitable means are mounted on the body member 2 at the side wall 19 thereof and in engagement with the second end flange 6 of the extensible member 7 and with the other end 9 of the mounting member 3 for retaining the mounting member 3 and the extensible member 7 in the valve chamber 4 of the body member 2 and for seating the first and second end flanges 5 and 6 of the extensible member 7.

In the illustrated embodiment, a flange retainer member 36 is positioned in engagement with the second end flange 6 of the extensible member 7 and in engagement with the other opposite end 9 of the mounting member 3. The flange retainer member 36 is adapted to effect sealing engagement between the second end flange 6 and the other end 9 of the mounting member 3. The flange retainer member 36 is illustrated as an annular member having opposite faces 37 and 38. One face, for example the face 38, has a recess in the peripheral edge thereof thereby defining a shoulder 39 positioned intermediate the faces 37 and 38. The one face 38 is in engagement with the second end flange 6 of the extensible member 7. The shoulder 39 of the flange retainer member 36 is in engagement with the other end 9 of the mounting member 3. The other face 37 of the flange retainer member 36 is substantially flush or coplanar with the end surface 22 of the side wall 19 of the body member 2 and positioned to be engaged by an inlet fitting, as later described.

The exhaust fitting 18 is mounted on the side wall 19 and is a tubular member having a flow passage therethrough aligned with the exhaust openings 23 and 31 in the side wall of the body member 2 and mounting member 3 respectively for exhausting fluid from the valve chamber 4. The exhaust fitting 18 extends outwardly from the body member 2. In the illustrated structure, an internally threaded flange portion 40 of the exhaust fitting 18 is adapted to be mounted on the externally threaded annular portion 24 extending from the side wall 19 of the body member 2.

An outlet fitting 41 is mounted on the end wall 20 of the body member 2 and has a bore or flow passage therethrough coaxial with the outlet opening 14 through the annular portion 12. The outlet fitting 41 extends outwardly from the end wall 20 for conveying fluid into and out of the valve chamber 4. In the illustrated embodiment, one portion of an end flange 42 has an exterior surface thereof threaded to be received within complimentary threads in the surface defining the outlet opening 14 in the end wall 20. The end flange 42 of the outlet fitting 41 has a shoulder thereon engageable with the exterior surface of the end wall 20.

It is desirable to provide means within the outlet fitting 41 to restrict outwardly movement of the end wall 10 of the extensible member 7 and the valve element 16 thereon, thereby substantially preventing excessive deformation of the extensible member 7 in the event of high pressure within the valve device 1. In the illustrated embodiment, a recess 43 is formed in the interior surface of the outlet fitting 41 and is positioned adjacent the mounted end thereof. An abutment member 44 is mounted in the recess 43 and is positioned to be engaged by the valve element 16 in the event of excessive pressure in the extensible member 7. The abutment member 44 is illustrated as a wire or rod formed of non-corrosive metal, preferably spring steel, and has a center portion 45 thereof in form of a loop extending into the flow passage of the outlet fitting 41. Opposite end portions of the abutment member 44 are received in the recess 43 in the interior surface of the outlet fitting 41.

An inlet fitting 46 is mounted on the body member 2 and has a flow passage 47 therethrough for receiving and directing fluid into the extensible member 7. The inlet fitting 46 has means thereon engageable with the flange retainer member 36 for holding same in sealing engagement with the second end flange 6 of the extensible member 7 and for retaining the mounting member 3 in the valve chamber 4 and for seating the first and second end flanges 5 and 6 of the extensible member 7.

In the illustrated embodiment, the inlet fitting 46 includes a support member 48 in the form of an annular disc having a port or aperture therein positioned to permit flow into the extensible member 7 from the flow passage 47. The support member 48 has an externally threaded projection 49 received within complimentary threads on an interior surface of the end of the side wall 19 of the body member 2. The support member 48 has an annular portion 50 extending outwardly from the disc portion thereof and the annular portion 50 has a flange 51 extending radially outwardly therefrom.

The inlet fitting 46 includes a resilient portion formed of a suitable resilient material, such as rubber, plastic, or the like, and has an aperture in one end thereof with surfaces defining the aperture sized to sealingly engage the exterior surface of the annular portion 50. The end of the inlet fitting 46 is moved onto the annular portion 50 of the support member 48 to move the aperture defining surfaces thereof over the flange 51 and seat same on the exterior surface of the annular or tubular portion 50.

Fluid under pressure flows into the inlet fitting 46 through a suitable tubular member (not shown) and through the flow passage 47 and into the extensible member 7 to thereby move the extensible member end wall 10 into seating engagement with the valve seat 11 at the free end of the annular portion 12. The pressure of fluid within the extensible member 7 raises the thickened peripheral edge portion 34 of the valve element 16 to permit the fluid to flow through the passages or ports 15 and into and outwardly through the outlet opening 14. Fluid is caused to flow through the inlet fitting 46 and outwardly through the outlet fitting 41 in response to fluid under pressure within the inlet fitting 46 and within the tubular extensible member 7, or in response to suction at the outlet fitting 41 or through a suitable conduit (not shown) connected thereto. Fluid flowing into the valve chamber 4 from the outlet fitting 41 seats the thickened peripheral edge portion 34 of the valve element 16 to close the passages or ports 15 through the extensible member end wall 10 and moves the end wall 10 of the extensible member 7 out of seating engagement with the valve seat 11 at the free end of the annular portion 12 to permit the fluid to enter the valve chamber 4 by flowing through the ports 17 defined by the circumferentially spaced support members and rim portion of the first end flange 5 of the extensible member 7 and thereby flowing into the mounting member 3 and outwardly through the exhaust openings 31 and 23 and the exhaust fitting 18.

It is to be understood that while I have illustrated and described one form of my invention, it is not to be limited to the specific form or arrangement of parts herein described and shown.

What I claim and desire to secure by Letters Patent is:

1. A valve device comprising:

a. a valve body having a valve chamber therein and an outlet opening for flow of fluid therethrough, said valve body having a valve seat surrounding the outlet opening;

b. an elongated tubular member positioned in said valve chamber and having one end thereof in sealing engagement with said valve body and in spaced relation with said valve seat, said tubular member having an end wall at the other end thereof and positioned in facing relation with and shaped to engage said valve seat to close said outlet opening, said end wall of said tubular member having ports therein spaced inwardly of said valve seat;

c. a valve element spaced inwardly from said valve seat and comprising a flexible member mounted on the end wall of said tubular member and having a portion thereof seating on said tubular member end wall and around the ports therein to close same, said valve element and said tubular member end wall being adapted to flex in response to fluid pressure in said tubular member to open the ports for flow therethrough; and d. means extending from said tubular member adjacent said end wall thereof and having a peripheral portion mounted on said valve body for supporting said tubular member end wall and permitting movement thereof toward and away from said valve seat for seating thereon and unseating of said tubular member end wall, said means for supporting said tubular member end wall being adapted to permit flow of fluid into said valve chamber from the outlet opening.

2. A valve device as set forth in claim 1 wherein said means for supporting said tubular member end wall comprises:

a. peripheral rim spaced from said tubular member end wall and mounted on said valve body; and b. a plurality of circumferentially spaced support members extending between said tubular member and said peripheral rim.

3. A valve device as set forth in claim 2 wherein:

a. said valve body has a side wall and an end wall defining the valve chamber therein;

b. said valve body end wall has an annular portion extending into the valve chamber and forming said valve seat;

c. said valve body side wall has surfaces defining a recess therein and an outwardly facing shoulder spaced from the recess; and d. said one end of said tubular member is seated on the outwardly facing shoulder and said peripheral rim of said means for supporting said tubular member end wall is seated in the recess in said valve body side wall.

4. A valve device as set forth in claim 3 including:

a. a second outwardly facing shoulder on the end surface of said side wall and surrounding said first named outwardly facing shoulder;

b. a retainer member positioned in engagement with said second outwardly facing shoulder and in engagement with said one end of said tubular member, said retainer being adapted to effect sealing engagement between said one end of said tubular member and said first named outwardly facing shoulder; and c. an inlet fitting mounted on said valve body and having a flow passage therethrough for receiving and directing fluid into said tubular member, said inlet fitting having means thereon engageable with said retainer member for holding same in sealing engagement with said one end of said tubular member.

5. A valve device as set forth in claim 3 wherein:

a. said tubular member has a plurality of accordian folds intermediate said one end and said other end thereof;

b. said end wall of said tubular member is a flexible planar member having said ports circumferentially spaced therein; and c. said support members each extend from and each have one face thereof substantially coplanar with said end wall thereby defining the circumferentially spaced ports for flow of fluid into said valve chamber from the outlet opening.

6. A valve device as set forth in claim 5 wherein:

a. one of the recess defining surfaces of said valve body side wall is coplanar with said valve body end wall; and b. said thickened peripheral rim has one face thereof spaced from the one face of each of said support members and in engagement with the one recess defining surface of said valve body side wall whereby said support members are spaced from said end wall of said valve body.

7. A valve device comprising:

a. a valve body member having a side wall and an end wall defining a valve chamber therein, said end wall having means defining an outlet opening for flow of fluid therethrough and an annular portion extending into the valve chamber and forming a valve seat, said end wall having surfaces defining a recess therein and surrounding said annular portion;

b. a valve mounting member mounted in said valve body member and having opposite ends and a fluid passage therethrough, said valve mounting member opposite ends each having surfaces defining respective outwardly facing shoulders;

c. a resilient extensible elongated tubular member positioned in said valve mounting member and having a first end flange seated on one of the outwardly facing shoulders and a second end flange seated on the other outwardly facing shoulder of said valve mounting member, said first end flange having a plurality of ports therein for flow fluid therethrough, said extensible member having an end wall shaped to engage said valve seat to close said outlet opening and having a plurality of ports therein spaced inwardly of said valve seat;

d. a valve element spaced inwardly from said valve seat and comprising a flexible member mounted on the end wall of said extensible member and having a portion thereof seating on said extensible member end wall and around the ports therein to close same, said valve element and said extensible member end wall being adapted to flex in response to fluid pressure in said extensible member to open the ports for flow therethrough; and e. means mounted on said valve body member side wall and in engagement with said extensible member second end flange and said valve mounting member other end for retaining said valve mounting member in said valve body member and seating said extensible member first and second flanges.

8. A valve device as set forth in claim 7 wherein:

a. said extensible member has a plurality of accordian folds intermediate said first and second end flanges thereof to permit longitudinal movement of said extensible member end wall;

b. said end wall of said extensible member is a flexible planar member having said ports circumferentially spaced therein; and c. said first end flange of said extensible member extends from and is substantially coplanar with said extensible member end wall and has said ports circumferentially spaced therein.

9. A valve device as set forth in claim 7 wherein:

a. said first end flange has a thickened peripheral rim having one face thereof substantially coplanar with the one end of said valve mounting member; and b. said valve mounting member one end and said one face of said peripheral rim are each in engagement with said valve body member end wall whereby said first end flange is spaced from said end wall of said body member to permit flow through said ports therein.

10. A valve device as set forth in claim 7 wherein said means for retaining said valve mounting member in said valve body member and seating said extensible member first and second flanges comprises:

a. a flange retainer member positioned in engagement with said second end flange of said extensible member and in engagement with said respective opposite end of said valve mounting member, said flange retainer being adapted to effect sealing engagement between said second end flange and said respective valve mounting member opposite end; and b. an inlet fitting mounted on said valve body member and having a flow passage therethrough for receiving and directing fluid into said extensible member, said inlet fitting having means thereon engageable with said flange retainer for holding same in engagement with said second end flange of said extensible member.

11. A valve device as set forth in claim 10 wherein:

a. said extensible member has a plurality of accordian folds intermediate said first and second end flanges thereof to permit longitudinal movement of said extensible member end wall;

b. said end wall of said extensible member is a flexible planar member having said ports circumferentially spaced therein;

c. said first end flange of said extensible member extends from and is substantially coplanar with said extensible member end wall and has said ports circumferentially spaced therein;

d. said first end flange has a thickened peripheral rim having one face thereof substantially coplanar with the one end of said valve mounting member; and e. said valve mounting member one end and said one face of said peripheral rim are each in engagement with said valve body member end wall whereby said first end flange is spaced from said end wall of said body member to permit flow through said ports therein.

* * * * *